United States Patent [19]

Herzog

[11] Patent Number: 4,735,343

[45] Date of Patent: Apr. 5, 1988

[54] FEEDER FOR BOTTLE CAPPER

[76] Inventor: Michael Herzog, 135 Industrial Blvd., Riverhead, N.Y. 11901

[21] Appl. No.: 591,127

[22] Filed: Mar. 19, 1984

[51] Int. Cl.$^4$ .......................... B23Q 7/12; B65H 9/00
[52] U.S. Cl. .................................. 221/159; 221/283;
221/254; 198/398; 198/397; 198/393
[58] Field of Search .............. 221/156, 157, 158, 159,
221/160, 283, 254; 193/44; 198/398, 397, 399,
393, 863, 699, 396, 453

[56] References Cited

U.S. PATENT DOCUMENTS

| | | | |
|---|---|---|---|
| 1,053,209 | 2/1913 | Neumann | 198/453 |
| 1,250,824 | 12/1917 | Eshleman | 198/863 |
| 1,432,002 | 10/1922 | Wentz | 198/699 |
| 2,609,912 | 9/1952 | Engel | 198/398 X |
| 3,265,185 | 8/1966 | Weselik | 198/396 |
| 3,275,121 | 9/1966 | Mueller | 221/156 X |
| 3,306,425 | 2/1967 | Rapp, Jr. et al. | 221/156 X |
| 3,362,581 | 1/1968 | Cordes | 221/241 |
| 3,970,218 | 7/1976 | Lee | 221/157 |

Primary Examiner—Joseph J. Rolla
Assistant Examiner—David H. Bollinger

[57] ABSTRACT

A feeder for a bottle capping machine comprising a hopper to receive and direct the caps to a conveyor which transports the caps to a chute transversely disposed to the conveyor housing wherein the conveyor housing is adjustably secured to the capping machine whereby the housing can be angularly adjusted to cause bottle caps improperly oriented to fall to the bottom of the conveyor wherein the conveyor housing has an angular wiper bar to force properly oriented caps to be discharged into the chute and then feed to the capping machine, there being provided a display window and wherein the conveyor has adjustably spaced flite bars which are adapted to transport caps of various dimensions.

4 Claims, 1 Drawing Sheet

U.S. Patent   Apr. 5, 1988   4,735,343

FEEDER FOR BOTTLE CAPPER

BACKGROUND OF THE INVENTION

The instant invention relate generally to feeders and more specifically to a feeder for a bottle capper machine.

SUMMARY OF THE INVENTION

A principal object of the present invention is to provide a feeder for a bottle capper machine that can accomodate all sizes of caps without the use of complicated change over parts.

Another object is to provide a feeder for a bottle capper machine that accomodates a bulk load of caps which are loaded at waist level to eliminate the need of an operator to climb a ladder thereby giving an added safety factor.

An additional object is to provide a feeder for a bottle capper machine that will reject sided caps positioned therein so that they will not be discharged improperly from the feeder.

A further object is to provide a feeder for a bottle capper machine that is simple and easy to use.

A still further object is to provide a feeder for a bottle capper machine that is economical in cost to manufacture.

Further objects of the Invention will appear as the description proceeds.

To the accomplishment of the above and related objects, this invention may be embodied in the form illustrated in the accompanying drawings, attention being called to the fact, however, that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
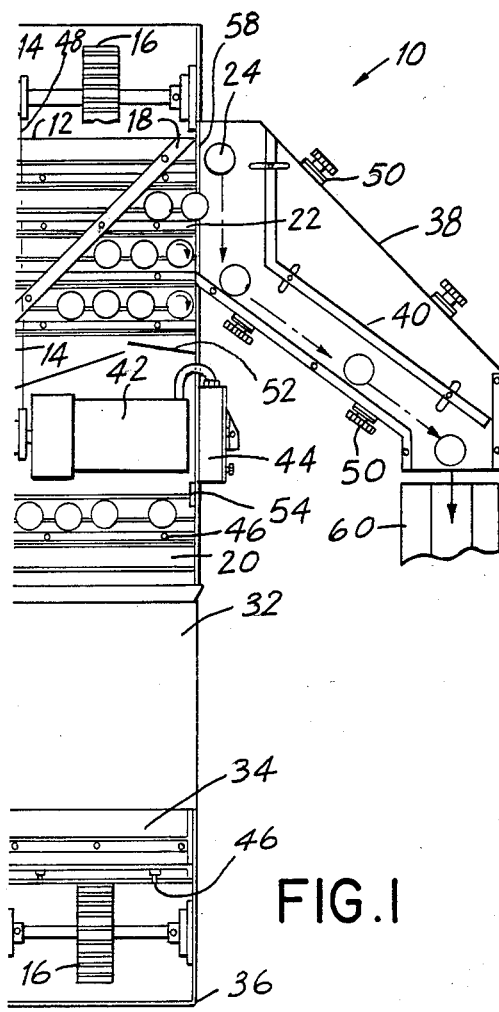
FIG. 1 is a front view of the Invention with parts broken away.
Figure 2:
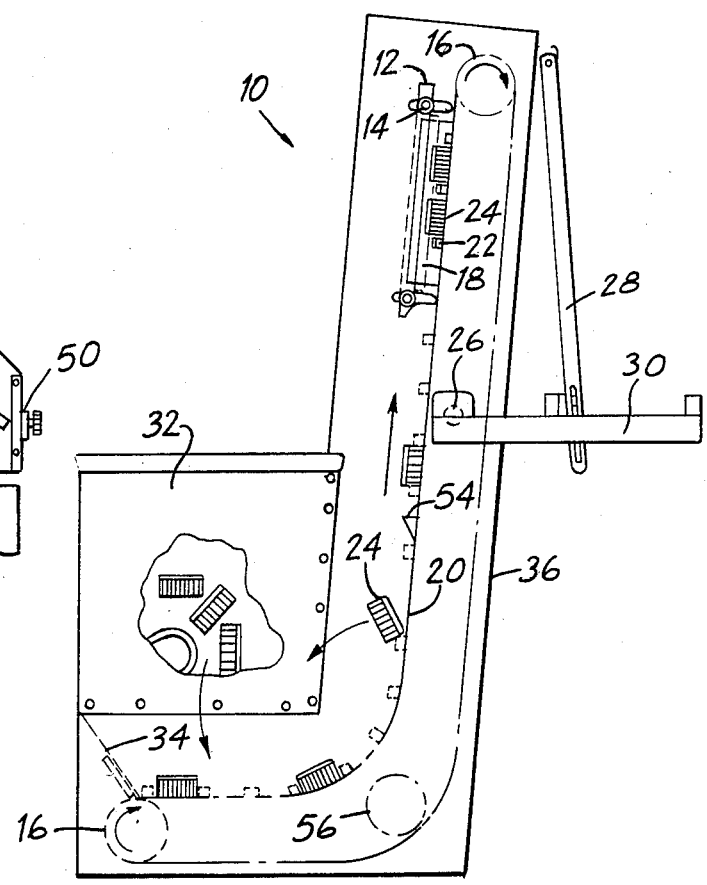
FIG. 2 is a side view of the Invention.

Turning now descriptively to the drawings, in which similar reference characters denote similar elements throughout the several views, FIGS. 1 and 2 illustrate a new bottle cap escalator feeder 10. The feeder is intended to have a high feed rate of caps 24 utilizing a minimum number of parts on the feeder. The feeder 10 accomodates a bulk load of caps which are loaded into a hopper or storage bin 32 at waist level. The need of an operator to climb a ladder is eliminated thereby giving an added safety factor.

The hopper 32 contains caps 24 of a given size that leave the hopper one at a time and fall into a continuous L-shaped elevator or conveyor chain 20 by a tumbling action within the hopper. A baffle 34 is angularly positioned at end of the conveyor chain 20 and hopper 32 so as to allow the caps to fall back onto the conveyor chain. The caps are lifted away from the hopper 32 by positioning or pocketing themselves between flite bars 22 on the conveyor chain 20. The conveyor chain has sprocket drives 16 at each end and a roller 56 positioned at a bend thereof.

The escalator feeder 10 can accomodate all sizes of caps 24, that range from 16 mm to 120 mm in diameter, without the use of complicated changeover parts. The change is achieved by moving the flite bars 22 in different spacings 46 provided on the chain 20. The spacing of flite bars 22 can be varied by such conventional means as removeable connectors which are threaded or snap mounted in holes in the conveyor chain. The flite bars are secured to the conveyor chain by said connectors which pass through appropriate aligned holes in the conveyor chain and the flite bars. By mounting the flite bars at different holes in the conveyor chain the spacing of the bars can be varied. The flite bars can be provided in different widths and heights to suit various size caps.

Conveyor speeds are variable thus a D.C. motor drive 42 that is operated by a motor controller 44. A drive roller chain 48 is continuously connected between the drive 42 and the top sprocket drive 16.

As the caps proceed up the inclined conveyor 20, they are kept in place by their own center of gravity. The solid top of each cap 24 is heavier than the open end, thereby having a center of gravity closer to the chain 20. An ascending cap 24 with the solid top facing away from the chain 20 will fall back into the storage bin 32 due to its outside center of gravity and be recirculated. The flite bars 22 vary in height and thickness and are formulated to each cap 24.

The weight of the cap feeder 10 is supported by a mounting bracket 30 which is secured to the bottle capper support structure. Bracket 30 has two pivot pins 26 on which the angel of feeder chasis 36 and conveyor 20 can be adjusted. A tilt arm and indicator scale 28 is adjustably secured to brackets 30 for locking chasis 36 in an appropriate angular position so that proper balance and gravity effect can be achieved.

Accepted caps 24 ascending on the conveyor 20 encounter two safety devices. A stacked cap eliminator 52 rejects nested caps or caps not seated between the flite bars 22 properly. An edge of a cap rejector 54 will remove caps overhanding the end of the flite bars 22.

Caps 24 reaching a cap retaining window or wiper plate 12 are now oriented as required with open facing outward. The wiper plate 12 holds the caps captive until contacting a wiper bar 18 will cause the caps to slide to the right hand discharge opening 58. They exit at the side while being pushed by the wiperbar 18 through a rolling motion into a discharge chute 38. The wiperbar 18 is adjustable for varying cap heights using knobs 14 provided. Affixed to the cap retaining window 12 is the wiperbar 18. The window 12 is adjustable with the wiperbar 18 as a complete assembly and allows for visability of cap feeding.

The discharge chute 38 transports the caps 24 to a capping machine 60. Chute 38 may be provided with knobs or brackets 50 for various desireable adjustments. Rails 40 in chute 38 are used to guide the caps down the chute. The rails can be adjusted to suite rolling caps of different diameters. The means for adjustment of the chute 38 and rails 40 are conventional and not the subject of this invention.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A feeder for supplying a plurality of caps to a bottle capper machine which comprises:

(a) a hopper containing said caps of a given size, said caps leave said hopper one at a time by tumbling action within said hopper;
(b) a continuous L-shaped conveyor chain having a plurality of flite bars; and
(c) a baffle being angularly positioned at end of said conveyor chain and said hopper so as to allow said caps to fall back onto said conveyor chain and lifted away from said hopper by said caps positioning between said flite bars on said conveyor chain, wherein said conveyor chain further comprises:
  (a) a pair of sprocket drives, each said sprocket drive located at each end of said conveyor chains; and
  (b) said flite bars being adjustable to engage various sized vaps further comprising:
    (a) a D.C. motor drive;
    (b) a drive roller chain continuously connected between said D.C. motor drive and said top sprocket drive; and
    (c) a motor controller electrically connected to said D.C. motor drive to vary speed of said conveyor chain, further comprising:
      (a) a chasis with a top end having a discharge opening adjacent said top end, said chasis enclosing said conveyor chain;
      (b) a bracket mounted on said chasis at said top end to adjust the inclination of said conveyor chain; and
      (c) a tilt arm and indicator scale pivotally mounted to said chasis for locking the inclination of said chasis in position with said bracket so that proper balance and gravity effect can be achieved allowing ascending caps with their solid tops facing towards said conveyor chain to proceed up said conveyor chain and allowing said caps with their said solid tops facing away from said conveyor chain to fall back into said hopper due to outside center of gravity to be recirculated.

2. A feeder as recited in claim 1, further comprising:
(a) a stacked cap eliminator mounted on said chasis for rejecting stacked caps; and
(b) a cap rejector mounted on said chasis, said cap rejector having an edge to remove said caps overhanding ends of said flite bars, 3. A feeder as in claim 2, further comprising:
(a) a cap retaining window mounted to said chasis for holding said caps captive and viewing said caps with said solid tops facing towards said conveyor chains;
(b) a wiper bar affixed to said cap retaining window, said wiper bar causing said caps to slide to said discharge opening in said chasis and exit; and
(c) a discharge chute affixed to said discharge opening in said chasis, said discharge chute allowing said caps to be transported to said capping machine.

4. A feeder as recited in claim 3, further comprising adjustment knobs mounted on said cap retaining window and wiper bar said adjustment knobs are used to adjust said cap retaining window and wiper bar to accomodate various heights of said caps.

* * * * *